W. H. WALLACE.
FLASH LIGHT ATTACHMENT FOR PHOTOGRAPHIC CAMERAS.
APPLICATION FILED DEC. 4, 1909.
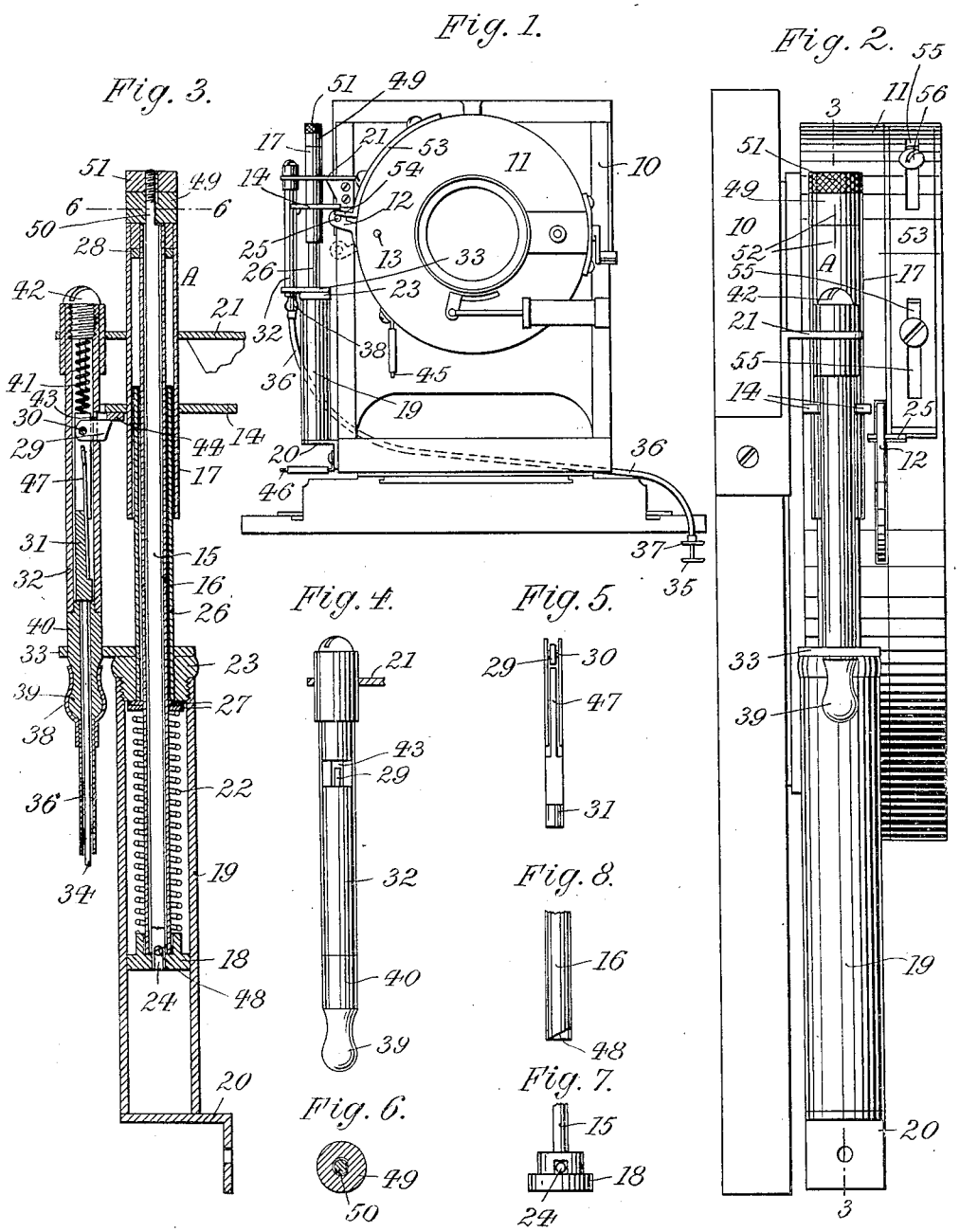

UNITED STATES PATENT OFFICE.

WILLIAM H. WALLACE, OF NEW YORK, N. Y., ASSIGNOR TO MULTI SPEED SHUTTER COMPANY, OF NEW YORK, N. Y., A CORPORATION OF NEW YORK.

FLASH-LIGHT ATTACHMENT FOR PHOTOGRAPHIC CAMERAS.

972,419. Specification of Letters Patent. Patented Oct. 11, 1910.

Application filed December 4, 1909. Serial No. 531,313.

*To all whom it may concern:*

Be it known that I, WILLIAM H. WALLACE, a citizen of the United States, residing at New York city, Manhattan, county and State of New York, have invented new and useful Improvements in Flash-Light Attachments for Photographic Cameras, of which the following is a specification.

This invention relates to an attachment for photographic cameras which, by a single operation, first ignites the flash powder and then opens the shutter at a predetermined and preferably regulable interval. As a certain time elapses between the ignition of the flash powder and the maximal luminosity of the flash light, and as the exposure should take place at such maximal luminosity, it is of importance that the interval between ignition and exposure be placed under the full control of the operator. By my invention this desirable result is attained and furthermore the operation of the device is greatly simplified in as much as ignition and exposure are effected by a single manipulation.

In the accompanying drawing: Figure 1 is a front elevation of the front of a photographic camera provided with my improved flash light attachment; Fig. 2 an enlarged left hand side view of part of Fig. 1; Fig. 3 a longitudinal section on line 3—3, Fig. 2; Fig. 4 a detail of the slide-containing casing; Fig. 5 a detail of the slide; Fig. 6 a cross section on line 6—6, Fig. 3; Fig. 7 a detail of the piston head, and Fig. 8 a detail of the bottom end of the tube inclosing the piston rod.

The front 10 of a camera, which is slidable as usual for focusing, carries the shutter frame 11 provided with suitable shutter releasing means. These means may consist of a spring-influenced lever 12 pivoted at 13 to frame 11, and which, when swung downward, (dotted lines Fig. 1), releases the shutter in the usual manner. For operating lever 12, a tappet 14 or similar device is provided which receives its movement in manner hereinafter described. As for reasons already stated, the flash light should be set off shortly anterior to the exposure, tappet 14 is utilized as a means for closing an electric circuit which produces the igniting spark prior to the release of the shutter by said tappet. Tappet 14 is attached to a vertically reciprocative plunger or movable member A, shown to be composed of a piston rod 15 and a pair of concentric tubes 16, 17 encircling said rod. The piston head 18 moves within the cylinder 19 of a suitable liquid or air brake, attached to the camera front by bracket 20, while plunger A, is guided within a perforated arm 21 also secured to said front.

Plunger A, is normally depressed by a coiled spring 22 interposed between piston head 18 and cylinder head 23, said spring encircling piston rod 15 and also inner tube 16 which is stepped into the piston head. Communication is established between the two compartments of cylinder 19, at opposite sides of piston head 18, by means of an angular duct 24 formed in said head.

In order to steady the plunger and sheathe the piston rod, the latter is encompassed by a tubular guide 26 which extends upwardly from head 23 and is telescoped by tubes 16, 17. Between spring 22 and head 23 are interposed a number of washers 27, while a packing 28 fitted between tubes 16, 17 is adapted to engage the upper edge of guide 26 when plunger A, is lowered.

If it is desired to make an exposure, plunger A, is raised manually, so as to become engaged by a latch 29 upon the withdrawal of which, spring 22 will pull the plunger down, so that its tappet 14 will consecutively close the circuit of the powder-igniting spark and release the shutter, as previously described. Latch 29 is pivoted at 30 to a slide 31 movable within a cylindrical casing 32, carried by arm 21 and by a plate 33 which extends laterally from cylinder head 23. Against the bottom of slide 31 bears one end of a flexible wire or push bar 34, the other end of which extends within convenient reach of the operator and carries a button, handle or similar device 35. Wire 34 is incased within a flexible tube 36 having a finger guard 37 and carrying a spring clasp 38 which removably engages a perforated knob 39 formed on the bottom piece 40 of casing 32.

Slide 31 is influenced by a spring 41 located within the upper end of casing 32 and bearing with one end against said slide, while its other end bears against a screw plug 42 tapped into casing 32. Latch 29 plays within an aperture 43 of casing 32 and in its operative position is supported by the lower perimeter of said aperture. When the operator presses button 35, slide 31 will, by wire 34, be raised against the action of spring 41, so that latch 29 will, by bearing against upper perimeter of aperture 43, be swung inward. In this way the latch is withdrawn from beneath a shoulder 44 of plunger A, so that the latter is free to be pulled down by its spring 22. During this movement tappet 14 will engage a pin 25 of lever 12 for the purpose of first metallically connecting the poles 45, 46 of the flash light igniting current, and then operating the shutter lever 12. Upon the release of button 35, spring 41 will lower slide 31 and again project latch 29 outward, the impetus for such movement being given by a leaf spring 47 secured to the slide.

If desired, the resistance offered by the liquid brake may be made adjustable, so that the device may be set to different qualities of flash powder or different kinds of pressure mediums. For this purpose, the area of the duct connecting the upper and lower compartments of cylinder 19 is made regulable in the following manner: Piston rod 15 may be turned within tube 16 to impart a similar movement to head 18. Tube 16 has a gradually widening notch 48 at its lower end, which permits the passage of a greater or less quantity of the pressure medium, as the position of duct 24 relatively to notch 48 is changed by a partial rotation of rod 15. The latter is manipulated by a collar 49 fitted upon the upper flattened end 50 of rod 15 and adapted to be forced against upper edges of tubes 16, 17 by a jam nut 51. If the brake is to be set, nut 51 is loosened and piston rod 15 is turned by collar 49, the relative position of the ducts 24, 48 being indicated by a suitable gage 52.

Means may be provided for varying the play of the shutter releasing lever, so as to thereby change the interval between ignition and exposure without changing the speed of the plunger. This additional adjustment has for its object, more particularly, to adapt the apparatus to varying quantities of flash powder. As shown, there is secured to shutter frame 11, a segmental plate 53 carrying a stop 54 arranged in the path of pin 25. Plate 53 is provided with elongated slots 55 for the accommodation of screws 56 tapped into frame 11. By slacking screws 56, plate 53 may be shifted, so as to raise or lower stop 54 and thus alter the play of lever 12, as will be readily understood.

It will be seen that by my invention I am enabled to make extremely short exposures, because the moment of opening the shutter may be made coincident with the moment of extreme luminosity. That is to say, if, as heretofore, the opening of the shutter takes place simultaneously with the starting of the spark producing means, a fraction of a second will elapse until the powder is fully ignited, during which time the shutter must remain open. This objectionably long period of exposure is entirely eliminated by my invention, so that the sharpness of the photographs is greatly increased.

I claim:

1. A photographic camera provided with a manually operable spring-influenced slide, a latch carried thereby, a plunger adapted to be engaged by the latch, and means controlled by said plunger for successively closing a flash light igniting circuit and opening the shutter.

2. A photographic camera provided with a movable member, means controlled by said member for successively closing a flash light igniting circuit and opening the shutter, and means for adjusting the speed of said member.

3. A photographic camera provided with a spring-influenced plunger, a brake controlling the speed thereof, means for setting the brake, and means controlled by said plunger for successively closing a flash light igniting circuit and opening the shutter.

4. A photographic camera provided with a spring-influenced plunger having a head, a cylinder engaged by the head, a liquid charge within the cylinder, a regulable liquid duct connecting the cylinder-compartments at opposite sides of the head, and means controlled by the plunger for successively closing a flash light igniting circuit and opening the shutter.

5. A photographic camera provided with a movable member, a shutter releasing lever, means controlled by said member for successively closing a flash light igniting circuit and operating the lever, and means for controlling the play of said lever.

6. A photographic camera provided with a movable member, a shutter frame, a shutter releasing lever pivoted thereto, means controlled by the movable member for successively closing a flash light igniting circuit and tilting the lever, and a stop adjustably secured to the shutter frame and adapted to be projected into the path of the shutter releasing lever.

Signed by me at New York city, (Manhattan,) N. Y., this 3rd day of December, 1909.

WILLIAM H. WALLACE.

Witnesses:
W. R. SCHULZ,
FRANK V. BRIESEN.